US010586292B2

(12) United States Patent
Ramseyer

(10) Patent No.: US 10,586,292 B2
(45) Date of Patent: Mar. 10, 2020

(54) VEHICLE INFORMATION COLLECTION SYSTEM AND MODULE THEREFOR

(71) Applicant: B & G Technologies, LLC, Sterling Heights, MI (US)

(72) Inventor: Robert Ramseyer, Farmington, MI (US)

(73) Assignee: B & G Technologies, LLC, Sterling Heights, MI (US)

( * ) Notice: Subject to any disclaimer, the term of this patent is extended or adjusted under 35 U.S.C. 154(b) by 674 days.

(21) Appl. No.: 14/565,096

(22) Filed: Dec. 9, 2014

(65) Prior Publication Data

US 2015/0088367 A1  Mar. 26, 2015

Related U.S. Application Data

(63) Continuation of application No. 13/545,785, filed on Jul. 10, 2012, now Pat. No. 8,907,816, which is a
(Continued)

(51) Int. Cl.
*G06Q 50/10* (2012.01)
*G06Q 10/02* (2012.01)
(Continued)

(52) U.S. Cl.
CPC ............. *G06Q 50/10* (2013.01); *G06Q 10/02* (2013.01); *G06Q 10/087* (2013.01); *G07C 5/008* (2013.01);
(Continued)

(58) Field of Classification Search
CPC .... G07C 5/0808; G07C 5/0841; G07C 5/085; G07C 5/008; G07C 2205/02
See application file for complete search history.

(56) References Cited

U.S. PATENT DOCUMENTS 5,812,070 A  9/1998  Tagami et al.
6,006,148 A  12/1999  Strong
(Continued)

FOREIGN PATENT DOCUMENTS

JP  2003076803 A  3/2003
JP  2003271851 A  9/2003
(Continued)

OTHER PUBLICATIONS

U.S. Patent and Trademark Office Non-Final Office Action dated Sep. 3, 2010 relating to U.S. Appl. No. 12/015,114.
(Continued)

*Primary Examiner* — Hongmin Fan
(74) *Attorney, Agent, or Firm* — Honigman LLP

(57) ABSTRACT

A method for managing vehicle check in at an automotive service center comprising the steps of connecting a device to the diagnostic port of an unknown vehicle and, without user input to the device, automatically downloading vehicle identification data and odometer data from the vehicle, transferring the vehicle identification data and odometer data from the device to work station at the service center, wherein the work station include a database, programmatically populating the vehicle identification data and odometer data into the database, the work station retrieving information based on one or both of the vehicle identification data and the odometer; and displaying the retrieved data on one or both of a computer and a paper printout.

10 Claims, 2 Drawing Sheets

Related U.S. Application Data continuation of application No. 12/435,670, filed on May 5, 2009, now abandoned, which is a continuation-in-part of application No. 12/015,114, filed on Jan. 16, 2008, now abandoned, which is a continuation-in-part of application No. 11/776,077, filed on Jul. 11, 2007, now abandoned, which is a continuation-in-part of application No. 11/077,437, filed on Mar. 10, 2005, now abandoned, which is a continuation-in-part of application No. 10/980,259, filed on Nov. 3, 2004, now abandoned, application No. 14/565,096, which is a continuation of application No. 12/581,423, filed on Oct. 19, 2009, now abandoned.

(60) Provisional application No. 60/516,931, filed on Nov. 3, 2003.

(51) Int. Cl.
*G06Q 10/08* (2012.01)
*G07C 5/00* (2006.01)
*G07C 5/08* (2006.01)

(52) U.S. Cl.
CPC .......... *G07C 5/085* (2013.01); *G07C 5/0808* (2013.01); *G07C 2205/02* (2013.01)

(56) References Cited

U.S. PATENT DOCUMENTS

| | | | |
|---|---|---|---|
| 6,141,610 A | 10/2000 | Rothert et al. | |
| 6,338,010 B1 | 1/2002 | Sparks et al. | |
| 6,408,232 B1 | 6/2002 | Cannon et al. | |
| 6,636,790 B1 | 10/2003 | Lightner et al. | |
| 6,647,420 B2 | 11/2003 | Hellbusch et al. | |
| 6,701,233 B2 | 3/2004 | Namaky et al. | |
| 6,732,031 B1 | 5/2004 | Lightner et al. | |
| 6,898,493 B2 | 5/2005 | Ehrman et al. | |
| 6,928,349 B1 | 8/2005 | Namaky et al. | |
| 2001/0037298 A1 | 11/2001 | Ehrman et al. | |
| 2002/0184062 A1 | 12/2002 | Diaz | |
| 2002/0193925 A1* | 12/2002 | Funkhouser | G07C 5/0808 701/31.8 |
| 2003/0004623 A1 | 1/2003 | Namaky et al. | |
| 2003/0130913 A1 | 7/2003 | Ehrman et al. | |
| 2003/0195825 A1 | 10/2003 | Ehrman et al. | |
| 2003/0216976 A1 | 11/2003 | Ehrman et al. | |
| 2003/0225707 A1 | 12/2003 | Ehrman et al. | |
| 2004/0015419 A1 | 1/2004 | Ehrman et al. | |
| 2004/0230356 A1* | 11/2004 | Namaky | G06F 11/2733 701/33.2 |
| 2004/0249557 A1* | 12/2004 | Harrington | G01M 17/007 701/115 |
| 2005/0029872 A1 | 2/2005 | Ehrman et al. | |
| 2005/0090941 A1* | 4/2005 | Stefan | G07C 5/008 701/1 |
| 2005/0150952 A1* | 7/2005 | Chung | H04L 63/12 235/385 |
| 2005/0182537 A1* | 8/2005 | Tefft | G07F 17/0014 701/29.6 |
| 2008/0027605 A1* | 1/2008 | Oesterling | G06Q 10/00 701/31.4 |
| 2011/0093159 A1 | 4/2011 | Boling et al. | |
| 2012/0053759 A1* | 3/2012 | Lowrey | G01C 21/26 701/2 |

FOREIGN PATENT DOCUMENTS

| | | |
|---|---|---|
| KP | 1020020064174 | 8/2002 |
| KP | 1020030001665 | 1/2003 |

OTHER PUBLICATIONS

SAE J1978 Revised Apr. 2002 (pp. 65 and 66).
www.dictionary.com, definition for "data bus".
U.S. Patent and Trademark Office Non-Final Office Action dated Jul. 11, 2011 relating to U.S. Appl. No. 12/435,670.
U.S. Patent and Trademark Office Final Office Action dated Jan. 11, 2012 relating to U.S. Appl. No. 12/435,670.
U.S. Patent and Trademark Office Non-Final Office Action dated Feb. 28, 2012 relating to U.S. Appl. No. 12/581,423.
U.S. Patent and Trademark Office Non-Final Office Action dated Jan. 31, 2013, relating to U.S. Appl. No. 13/545,785.
U.S. Patent and Trademark Office Non-Final Office Action dated Apr. 23, 2013, relating to U.S. Appl. No. 13/545,785.
U.S. Patent and Trademark Office Final Office Action dated Dec. 24, 2013, relating to U.S. Appl. No. 13/545,785.
U.S. Patent and Trademark Office Non-Final Office Action dated Mar. 21, 2014, relating to U.S. Appl. No. 13/545,785.

* cited by examiner

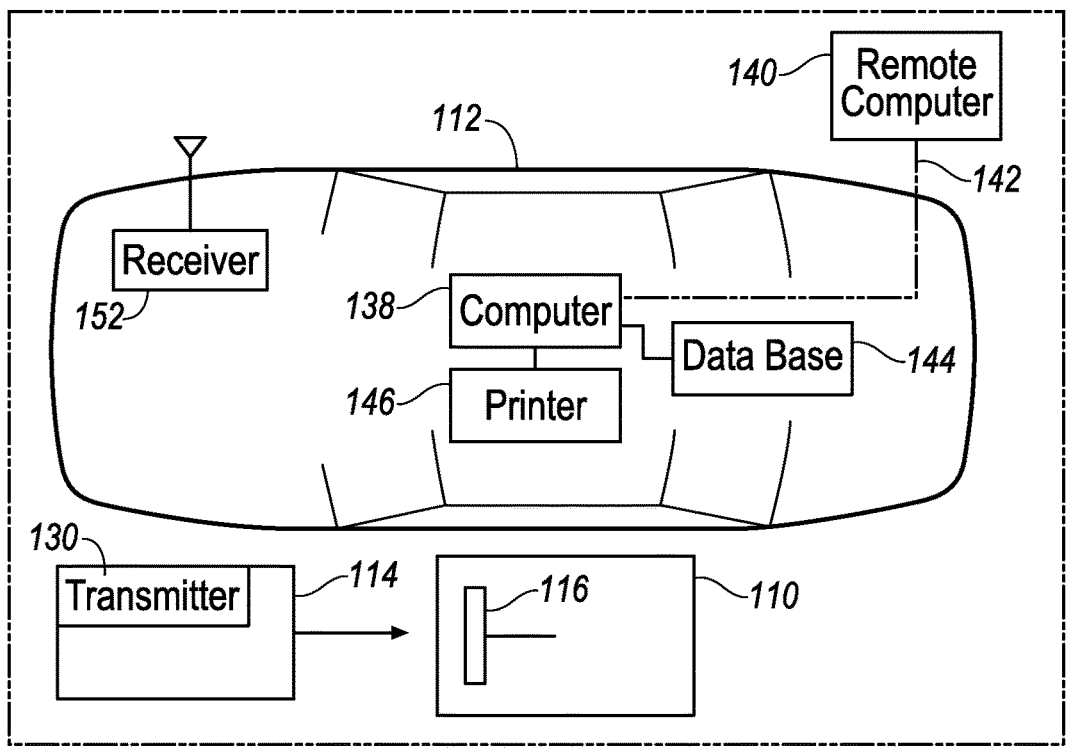
FIG. 3
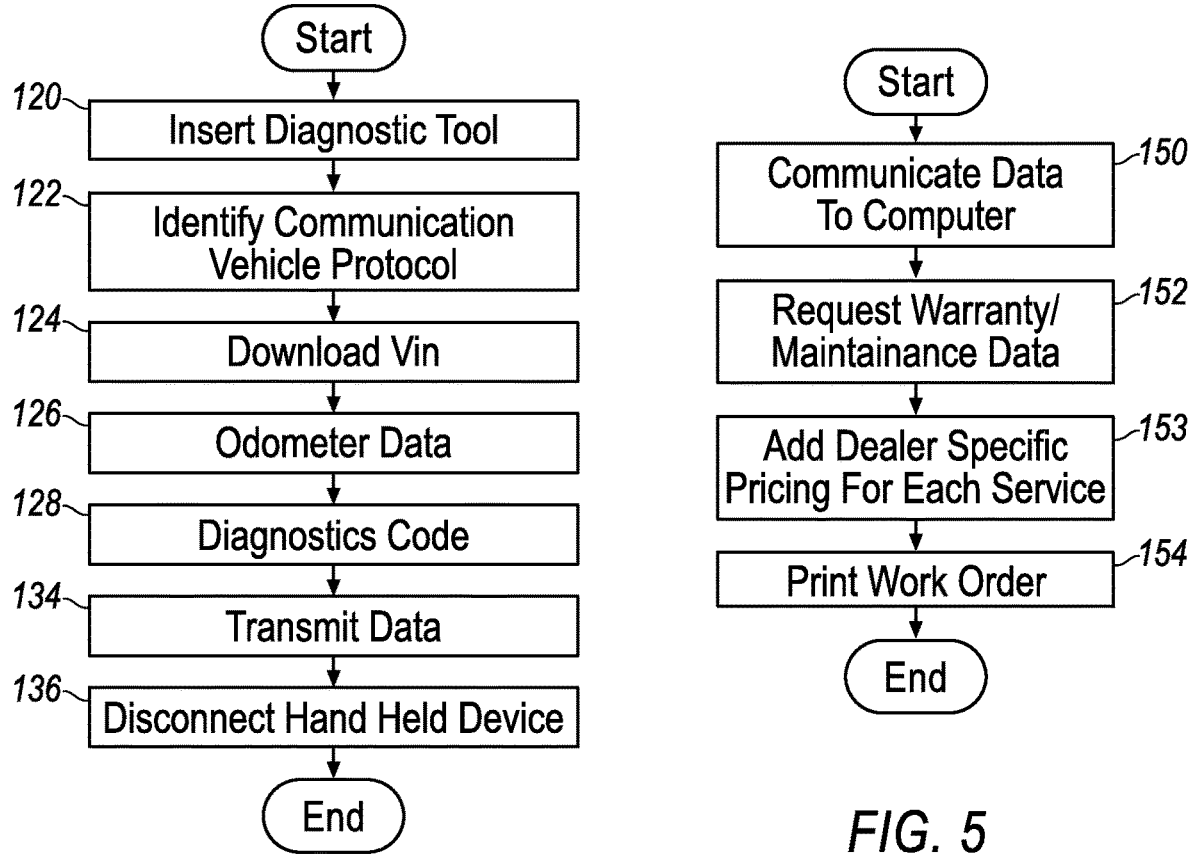
FIG. 4
FIG. 5

VEHICLE INFORMATION COLLECTION SYSTEM AND MODULE THEREFOR

RELATED APPLICATIONS

This application is a continuation of U.S. Patent application Ser. No. 13/545,785 filed on Jul. 10, 2012, now U.S. Pat. No. 8,907,816, which in turn was a continuation of U.S. application Ser. No. 12/435,670 filed on May 5, 2009, which is now abandoned, which is a continuation-in-part of U.S. Patent application Ser. No. 12/015,114, filed on Jan. 16, 2008, now abandoned, which is a continuation-in-part of U.S. Patent application Ser. No. 11/776,077, filed on Jul. 11, 2007, ow abandoned, which is a continuation-in-part of U.S. Patent application Ser. No. 11/077,437 filed on Mar. 10, 2005, now abandoned, which is a continuation-in-part of U.S. Patent application Ser. No. 10/980,259, filed on Nov. 3, 2004, now abandoned, which claims priority to U.S. Patent Application Ser. No. 60/516,931 filed Nov. 3, 2003, and this application is a continuation of U.S. Patent application Ser. No. 12/581,423, filed on Oct. 19, 2009 wherein the contents of the abovementioned applications are hereby incorporated by reference in their entirety.

BACKGROUND

Modern day automotive vehicles include a diagnostic port, also known as an OBDII port. Various parameters regarding the vehicle are accessible from the diagnostic port. These parameters include odometer reading, fuel level and the like.

Currently, most vehicles cannot be unlocked by utilizing the diagnostic port. Consequently, to date, it has not been possible for a central station to remotely unlock vehicles at remote locations which may be miles away from the central station.

Modern vehicles also include a key fob having a mechanical button which, upon actuation, unlocks the vehicle. These key fobs, however, have only a very limited range, typically about 30 or 40 feet. Consequently, a central station cannot use the fobs to selectively unlock vehicles at more distant locations from the central station.

In many situations, however, such as vehicle rental fleets, it is desirable to not only read the vehicle parameters at a central station, but also to selectively unlock the vehicles from the central station. For example, a central station may automatically read the vehicle parameters once a vehicle enters a rental return lot in order to compute the rental charges.

In other situations, such as a vehicle share fleet, vehicles are parked after use in various locations. Thereafter, a user deciding to rent a vehicle contacts the base station which runs the fleet to determine the location of a nearby shared vehicle in the fleet. The base station determines the location of a nearby vehicle and conveys that information to the user.

Even though the base station may transmit the location of a nearby vehicle to the user, it is still necessary for the authorized user to obtain the keys necessary to operate the vehicle. Although the base station may read and provide certain data to the vehicle through the diagnostic port, at present most vehicles may not be unlocked through the diagnostic port.

Consequently, in these situations it has been necessary to provide or deliver the keys for the automotive vehicle to the authorized user or otherwise provide special access to the keys to the user.

In addition, vehicle check in at an automotive service center, such as dealership, is a labor intensive, and therefore costly, routine for the service center. Typically, the vehicle identification data, or VIN, is first manually obtained from the vehicle. This VIN is typically contained on a stamped plate visible through the windshield of the vehicle.

The service advisor then also obtains the odometer reading from the vehicle. Armed with both the VIN as well as the odometer reading, the service center advisor is able to obtain the recommended maintenance for the vehicle through maintenance manuals contained at the service center or, alternatively, through a manual look up on the Web.

The service center may also check to see whether any warranty repairs are also required for the vehicle. This is typically accomplished by reference to a warranty folder or binder also maintained at the service center or, alternatively, through a manual look up on the Web.

Since the above-described procedure for vehicle check in at an automotive service center is both labor intensive and time consuming, the vehicle check in adds significantly to the overall cost of automotive repairs performed on the vehicle.

SUMMARY

This disclosure provides a system for managing a fleet of vehicles which overcomes the above-mentioned disadvantages of the previously known devices.

In brief, an implementation comprises a control circuit which is mounted to the vehicle and electrically connected to the diagnostic or OBDII port in the automotive vehicle. This control circuit preferably includes a program processor.

In an implementation a radio receiver receives radio signals from a remote base station. That receiver can have an output connected as an input signal to the control circuit.

The system may further include a key fob which is associated with the automotive vehicle. The key fob includes a mechanical button which, upon activation, transmits a radio signal over a relatively short distance to unlock the vehicle associated with that fob. An electromechanical actuator is then connected to an output from the control circuit so that, upon activation of the electromechanical actuator by the control circuit, the electromechanical actuator activates the fob button to unlock the vehicle doors.

In operation, essentially all vehicles come with two key fobs, each of which operate in the same fashion, but may have a means, such as an RFID tag, to distinguish between the two fobs. After a vehicle has been used, one key fob is left within the vehicle, e.g. in the glove compartment, and the vehicle is then locked.

When a subsequent user desires to use a vehicle, the user contacts the base station to determine the location of a nearby vehicle. Any conventional means, such as text messaging over a cell phone, may be utilized to communicate between the user and the base station.

After the user has contacted the base station to indicate a desire to rent a nearby vehicle, the base station, after verifying that the user is in fact an authorized user, determines the location of a nearby automotive vehicle. This may be done, for example, by a GPS unit on the vehicle which, upon command, transmits the location of the vehicle to the base station. That location is then transmitted to the authorized end user.

After the authorized end user locates the vehicle, the authorized end user again contacts the base station that the vehicle has been located. The base station then transmits a radio signal to the radio receiver. The radio receiver, in turn, generates an output signal to the control circuit which then generates an output signal to activate the electromechanical actuator to activate the fob button and unlock the vehicle doors. The user may then locate the second key fob within the interior of the vehicle and operate the vehicle as desired. Alternatively, the vehicle may be unlocked through the diagnostic port.

After the authorized user is finished using the vehicle, the authorized user locks the second fob within the vehicle and then contacts the base station to indicate that the use of the vehicle has been completed. The base station periodically acquires the vehicle information that has been monitored from the diagnostic port in order to compute the appropriate charges for the transaction.

In addition, in the event that the user leaves the vehicle after the use has been completed and takes the key fob with him or her, an RFID reader generates an output signal to the control circuit. The control circuit then transmits a signal through its radio transmitter to the central station indicating that the key fob has been removed from the vehicle. The central station may then immediately contact the last authorized user, e.g. through text messaging, to have the last user return the key fob to the vehicle.

In an implementation, a method is provided for managing a vehicle check in at an automotive service center.

In an implementation, a handheld device is connected to the diagnostic port on the automotive vehicle. The handheld device downloads data from the diagnostic port and first identifies the proper protocol to communicate to the vehicle. Once identified, the handheld device downloads the vehicle identification number (VIN), odometer data, and diagnostic codes, if any, from the vehicle.

In an implementation, the handheld device then transmits the downloaded data from the vehicle to a receiver at the service center. That receiver is coupled to a computer which is programmed to receive the data from the handheld device. Once received, the service center computer may transmit a warranty/maintenance request to a remote computer to obtain all warranty/maintenance and extended warranty contracts that are recommended for the vehicle as a function of the VIN, odometer data and diagnostic codes, if any. Once that information is obtained, the service center computer prints a report containing the recommended service and dealer-specific pricing for that service, and extended warranty contracts with pricing for that vehicle.

In an implementation, the warranty/maintenance data is maintained in a database at the service center. Consequently, after receipt of the VIN, odometer data, and diagnostic codes, if any, from the vehicle, the service center computer accesses the warranty/maintenance database at the service center to obtain the recommended service or repair information for the vehicle.

BRIEF DESCRIPTION OF THE DRAWINGS

A better understanding will be had upon reference to the following detailed description when read in conjunction with the accompanying drawing, wherein like reference characters refer to like parts throughout the several views, and in which:

FIG. 3 is a block diagrammatic view illustrating an apparatus to carry out the method according to an embodiment;

FIG. 4 is a flowchart illustrating the operation of a handheld device; and

FIG. 5 is a flowchart illustrating the operation of a service center computer.

DETAILED DESCRIPTION

Figure 1:
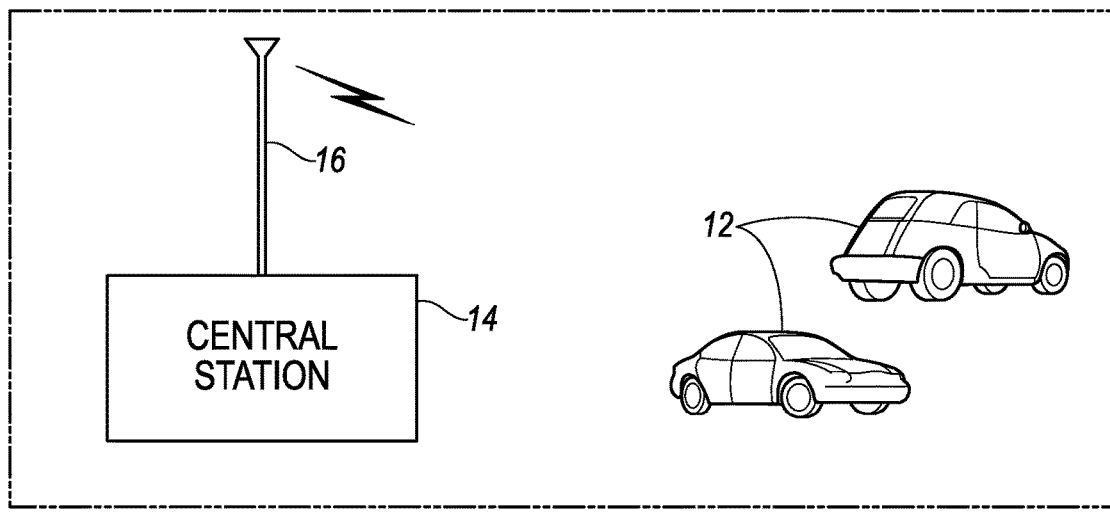
FIG. 1 is a diagrammatic view of an embodiment.

With reference first to FIG. 1, a diagrammatic view of an implementation of a system 10 for managing a fleet of automotive vehicles 12 is illustrated diagrammatically. As depicted, the system 10 includes a central station 14 which communicates with the automotive vehicles 12 by radio through a radio antenna 16. In an implementation, the vehicles 12, furthermore, may be at a known location, e.g. a rental vehicle return lot, or may be at various locations remote from the central station 14.

Figure 2:
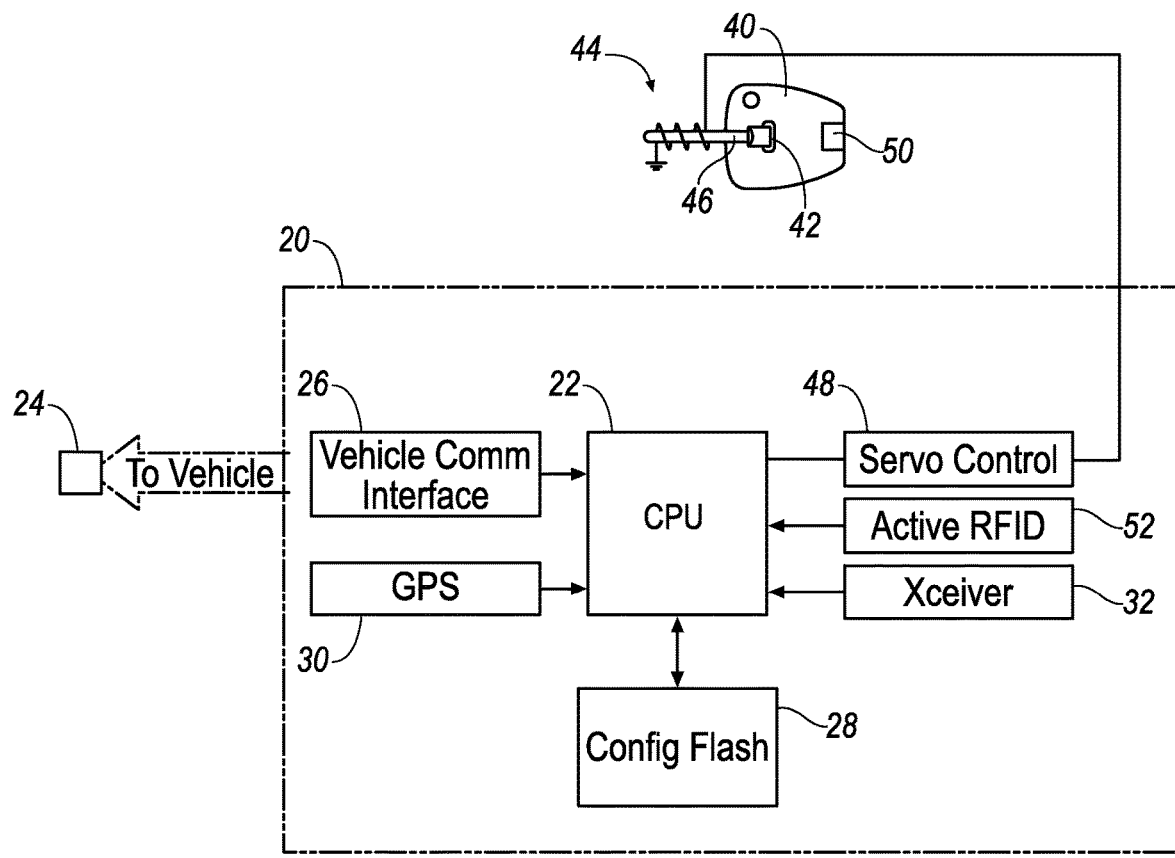
FIG. 2 is a block diagrammatic view of an embodiment.

With reference now to FIG. 2, a control circuit 20 may be associated with each of the vehicles 12. In an implementation, the control circuit 20 may include a processor 22 such as a microprocessor, which electronically communicates with a diagnostic or OBDII port 24 on the vehicle through a vehicle communication interface 26. The processor 22, under control of a program contained in memory 28, may access various parameters for the vehicle. In an implementation, these parameters include, for example, odometer reading, fuel tank level, and the like.

In an implementation, the control circuit may include a global positioning system (GPS) circuit 30 which provides an output signal to the processor 22 indicative of the current position of the control circuit 20. Such GPS systems 30 are conventional in construction so that a further description thereof is unnecessary.

In an implementation, the control circuit 20 communicates with the central station 14 (FIG. 1) through a radio transceiver 32 which may, for example, comprise a cellular telephone. The transceiver 32 provides input signals to the processor 22 under program control and, similarly, under program control transmits signals back to the base station 14.

Most automotive vehicles come with two separate key fobs 40. One key fob 40 is mounted to the control circuit 20 at a fixed location. This key fob 40 includes a mechanical button 42 which, upon depression, unlocks the vehicle doors. The key with the second key fob 41 is used by the driver to operate the vehicle.

An electromechanical actuator 44 is associated with the key fob 40 and has a movable member 46 which registers with the key fob button 42. Consequently, upon actuation of the electromechanical actuator 44, the member 46 extends and actuates the button 42 to unlock the vehicle.

The processor 22 controls the operation of the electromechanical actuator 44 through a control 48. Consequently, under program control by the processor 22, the processor 22 may selectively actuate the electromechanical fob button 42 to unlock the vehicle upon receipt of the appropriate command from the central station 14. Optionally the processor 22 may generate an enabling signal which enables normal operation of the vehicle. For example, the vehicle operation may be disrupted until receipt of the enabling signal.

Many fobs include an RFID tag 50 so that the vehicle may detect the presence of the key fob 40 when the key fob 40 is relatively near the vehicle. The RFID tag 50, however, typically differs not only between different vehicles, but also between the two fobs associated with a single vehicle.

An active RFID sensor 52 detects the presence or absence of the second key fob 40 used by the driver to operate the automotive vehicle. The RFID sensor 52 provides a signal to the processor 22. Other types of sensors, however, may alternatively be used to detect the presence or absence of the key fob 40. For example, a key fob receptacle may be provided which detects the physical presence or absence of the key fob.

In an implementation, the system manages a fleet of automotive vehicles in a rental car fleet. The rental car fleet may be maintained when not in use in a known rental fleet lot or, alternatively, the unused rental vehicles may be parked at various locations around the city waiting for the next subsequent user. In this case, the second key fob 41 with its key to operate the vehicle is locked inside of the vehicle 12.

An authorized user may then contact the central station to request the rental of a vehicle in any conventional fashion. For example, text messaging through a cellular telephone may be used to request the availability of a nearby automotive vehicle for rent.

Upon receipt of the request by the central station, the central station determines the location of a nearby rental vehicle by accessing the GPS data for that vehicle. Such GPS data is preferably obtained through the transceiver by the central station 14 at the termination of an authorized use of the vehicle by an authorized user. That location is then stored at the central station 14 in an appropriate computer record.

Alternatively, upon receipt of a request for an automotive vehicle from an authorized user, the central station 14 may query rental vehicles through the transceiver 32 and processor 22 of the current location of the vehicle through the GPS system 30. In either case, the location of a nearby vehicle is determined and that information is then conveyed to the authorized user in any conventional fashion, such as through text messaging.

Once the authorized user locates the vehicle, the authorized user again contacts the central station 14 to indicate that the vehicle has been found. At that time, the central station 14 transmits a radio signal to the transceiver 32. That radio signal is processed under program control by the processor 22 which then generates an activation command to the electromechanical actuator 44 through the control 48. Upon doing so, the electromechanical actuator 44 pushes or activates the fob button 42 to unlock the vehicle. The authorized user then finds the second or other key fob within the interior of the vehicle, e.g. in the glove compartment, and then utilizes the vehicle as desired.

At the conclusion of the rental period by the authorized user, the authorized user again locks the second key fob within the interior of the car and contacts the central station 14 to indicate that rental of the vehicle is no longer required. At that time, the central station 14 communicates through the transceiver 32 with the control circuit 20 to determine the various vehicle parameters, such as odometer, fuel level, and the like, through the diagnostic port 24. Such parameters may then be utilized by the central station to prepare the appropriate rental charges for the vehicle.

In order for the system to operate smoothly, it is necessary that the authorized user lock the second fob 41 with the key in the interior of the vehicle following the rental use by that user. However, in some cases, the authorized user may forget to lock the key fob 41 with the key within the vehicle and, instead, inadvertently take the key fob 41 with him or her.

In that situation, the RFID sensor 52 at the conclusion of the rental period will detect the presence or absence of the second key fob 41 by reading or attempting to read the RFID tag 50 on the second key fob 41. In the event that the RFID sensor 52 is unable to do so, an output signal is provided to the processor 22. The processor 22 then transmits a signal to the central station 14 through the transceiver 32 that the key fob has been removed from the vehicle at the end of the rental period. When this occurs, the central station 14 may immediately contact the last authorized user, e.g. by text messaging, to instruct that authorized user to return the key fob to the vehicle.

From the foregoing, it can be seen that the disclosed system provides a simple and yet highly effective system for managing a fleet of automotive vehicles which is particularly useful for a shared automotive vehicle fleet.

Now with reference to FIG. 3, an automotive vehicle 110 (illustrated only diagrammatically) arrives at a service center 112 for repair or maintenance. The service center 112 may comprise, for example, an automotive dealership, automotive repair center, or the like.

A handheld device 114 is then electrically connected by service center personnel to the diagnostic port 116 for the vehicle. This diagnostic port 116 is generally present on all modern vehicles and is of a standard configuration. With reference now to FIGS. 3 and 4, after insertion of the handheld device 114 into the diagnostic port 116 at step 120, the diagnostic tool 114, which preferably includes a processor of some sort, identifies the protocol to communicate with the vehicle at step 122. Once the communication protocol is identified at step 122, the handheld device 114 proceeds to step 124. At step 124 the handheld device 114 downloads the vehicle identification number (VIN) and then proceeds to step 126 where the odometer information is downloaded from the vehicle. Step 126 then proceeds to step 128 where the diagnostic codes, if any, are downloaded by the handheld device 114 through the diagnostic port 116.

With reference now to FIGS. 3 and 4, after the information has been downloaded into the handheld device 114, the handheld device 114 transmits via a transmitter 130 contained in the handheld device 114 to a radio receiver 132 at the service center 112 as indicated at step 134 (FIG. 4). The handheld device 114 is then disconnected from the diagnostic port 116 at step 136.

Although as described above, all of the relevant information, i.e. the VIN, odometer data, and diagnostic codes, if any, are downloaded and then transmitted by the handheld device 114 to the radio receiver 132, alternatively, the handheld device 114 may transmit data that has already been downloaded from the vehicle 110 while simultaneously downloading further data from the vehicle 110. Furthermore, any means of transmission, such as Wi-Fi, may be utilized to communicate wirelessly between the handheld device 114 and the receiver 132.

With reference now to FIGS. 3 and 5, at step 150 the receiver communicates the data received from the handheld device 114 to a computer 38 at the service center 112. Upon receipt of the data from the receiver 132, the computer 138 is programmed to generate an output signal to a remote computer 140 via a communication line 142, such as the World Wide Web, requesting any warranty/maintenance/service contract recommendations for the particular vehicle and with the particular odometer data at step 152. The remote computer 140, for example, may be maintained by the automotive manufacturer so that the automotive manufacturer may update any warranty information or maintenance information for access by multiple dealerships. As such, the information received by the computer 38 from the remote computer 140 would typically constitute the most up-to-date information regarding warranty or maintenance for the particular vehicle as well as repair information for any diagnostic code, if any.

With reference now particularly to FIG. 3, alternatively, the computer 138 at the service center 112 would obtain the recommended warranty/maintenance information, as well as any repair information or any diagnostic codes received from the vehicle 10, from a database 144 at the service center 112.

Referring again to FIGS. 3 and 5, after the computer 138 has received the recommended maintenance/warranty data as well as any recommended repairs as a function of the diagnostic codes, the computer 138 prints a work order on a printer 146 at step 154. In practice, the programmed computer 138 begins the printing of the work order on the printer 146 in a very short time, typically less than one minute, after the handheld tool 114 is connected to the diagnostic port 116.

The computer 138 may also update the maintenance/repair records for the particular vehicle.

A method in accordance with an implementation includes the steps of mounting an information module in a vehicle, connecting the module to the data bus of the vehicle gathering rental information from the data bus, sending rental information taken from the data bus to a remote station and calculating the rental charge for the vehicle using the rental information sent from the information module. Additionally, the system includes charging the customer for the rental and providing a receipt.

Thus is provided a fully automated and inexpensive information retrieval and delivery system for rental vehicles. The system permits the elimination of check-in attendants and ensures the accuracy of the delivery of information. The speed of rental check in is increased and vehicle maintenance problems are reduced by obtaining accurate information on such things as oil level, tire pressure and contained in diagnostic trouble codes.

In an implementation, an automated check-in system for a vehicle at a service facility such as a dealership or repair shop. The system includes a handheld information module which has a wire lead with a connector adapted for connection to the diagnostic port of a vehicle. The information module has a housing which holds information gathering device or processor, and wireless transmission device in similar fashion as described for the previous embodiment. As above, the processor gathers necessary information for the vehicle check in including the vehicle identification number, mileage, fuel level in the fuel tank and diagnostic data from the port. As described above, the inventors have provided a fully automated and inexpensive information retrieval and delivery system for rental vehicles. Accordingly, as such is fully automated, this provides means for electrically and automatically acquiring information from the OEM computer of a vehicle. It is to be appreciated, based on the foregoing disclosure, that such means may include a database that includes a plurality of predetermined protocols and an information collection means for electrically and automatically identifying a protocol from the predetermined protocols that handshakes with a protocol specific to the vehicle such that the information collector can automatically obtain the information without manual input.

This information is relayed by the wireless transmission device to a receiving station. The receiving station has a receiver and a CPU which places the information in a file for the vehicle from which the work order to process the vehicle can be produced. The information module may also be provided with a keyboard for entry of other information such as type of service which is requested by the customer and in the case of older vehicles information which is not provided automatically through the data bus.

What is claimed is:

1. A method for managing vehicle check in at an automotive service center and identifying a procedure to retrieve specific information including vehicle identification data and odometer data related to one or more unknown vehicles at the automotive service center, the method comprising the steps of:
   connecting a device to the diagnostic port of one of the one or more unknown vehicles;
   downloading the vehicle identification data and odometer data from the one of the one or more unknown vehicles, wherein the procedure to retrieve the specific information including the vehicle identification data and the odometer data is unknown to the device prior to the connecting step and is automatically identified during the connecting step by the device;
   transferring the vehicle identification data and odometer data from the device to a work station, wherein the work station include a database;
   programmatically populating the vehicle identification data and odometer data into the database;
   retrieving information based on one or both of the vehicle identification data and the odometer data at the workstation; and
   displaying the automatically-retrieved information on one or both of a computer and a paper printout.

2. A method as set forth in claim 1, wherein the retrieved information contains a recommended service and dealer specific pricing for the recommended service.

3. A method as set forth in claim 1, wherein retrieving information further comprises:
   the work station obtaining data representing one, some or all of warranty information, recommended maintenance information and service contract, or marketing information for the vehicle from a remote computer.

4. A method as set forth in claim 3, wherein retrieving information further comprises:
   communicating between the work station and the device over the World Wide Web.

5. A method as set forth in claim 1, further comprising: updating service records for the vehicle.

6. A method for managing vehicle check in at an automotive service center comprising the steps of:
   connecting a device to the diagnostic port of an unknown vehicle;
   downloading vehicle identification data and odometer data, vehicle, wherein the specific method to access the vehicle identification data and the odometer data are unknown to the device prior to this connection step and is automatically identified by the device;
   transferring the vehicle identification data and the odometer data from the device to a programmed computer at the service center; and
   entering one or both of the vehicle identification data and the odometer data into the service center business software on said programmed computer.

7. A method as set forth in claim 1, wherein at least one of the vehicle identification data, the odometer data and the retrieved information is programmatically populated into a work order.

8. A method as set forth in claim 7, wherein one or a combination of the items consisting of the vehicle identification data, the odometer data and the vehicle specific retrieved data is programmatically populated into a work order.

9. An information collection module for acquiring information from a vehicle and automatically identifying a procedure to acquire vehicle specific information from the vehicle, the tool comprising:
- a connector for connecting the tool to a vehicle; and
- means for acquiring the vehicle specific information from the vehicle, wherein the vehicle specific information is selected from the group consisting of a an odometer report, a fuel level report and a combination thereof,
- wherein the procedure to acquire the vehicle specific information is unknown to the tool prior to the step for acquiring the vehicle specific information and wherein the procedure is automatically identified during connecting the tool to the vehicle.

10. The information collection module as set forth in claim 9, wherein the information acquiring means includes a database having a plurality of predetermined procedures and the information acquiring means further includes means for identifying a procedure from the predetermined procedures that handshakes with a procedure specific to the vehicle such that the information collection module can automatically obtain the information without manual input.

* * * * *